United States Patent
Mese et al.

(10) Patent No.: US 9,652,395 B2
(45) Date of Patent: May 16, 2017

(54) CONFIGURATION OF STANDBY PORTION OF MEMORY BASED ON CONTEXT

(71) Applicant: Lenovo (Singapore) Pte. Ltd., New Tech Park (SG)

(72) Inventors: John Carl Mese, Cary, NC (US); Arnold S. Weksler, Raleigh, NC (US); Rod D. Waltermann, Rougemont, NC (US); Nathan J. Peterson, Durham, NC (US); Russell Speight VanBlon, Raleigh, NC (US)

(73) Assignee: Lenovo (Singapore) Pte. Ltd., New Tech Park (SG)

(*) Notice: Subject to any disclaimer, the term of this patent is extended or adjusted under 35 U.S.C. 154(b) by 48 days.

(21) Appl. No.: 14/707,299

(22) Filed: May 8, 2015

(65) Prior Publication Data
US 2016/0328334 A1 Nov. 10, 2016

(51) Int. Cl.
*G06F 12/00* (2006.01)
*G06F 12/0862* (2016.01)
*G06F 12/123* (2016.01)
*G06F 12/06* (2006.01)

(52) U.S. Cl.
CPC ...... *G06F 12/0862* (2013.01); *G06F 12/0692* (2013.01); *G06F 12/123* (2013.01); *G06F 2212/69* (2013.01)

(58) Field of Classification Search
None
See application file for complete search history.

(56) References Cited

U.S. PATENT DOCUMENTS

| | | | | |
|---|---|---|---|---|
| 2006/0064549 A1* | 3/2006 | Wintergerst | .......... | G06F 12/127 711/134 |
| 2008/0059571 A1* | 3/2008 | Khoo | .......... | G06Q 30/02 709/203 |
| 2013/0151645 A1* | 6/2013 | Siliski | .......... | G06F 17/30902 709/213 |
| 2013/0173513 A1* | 7/2013 | Chu | .......... | G06F 9/4443 706/14 |
| 2014/0379893 A1* | 12/2014 | Kannan | .......... | H04L 67/22 709/224 |
| 2015/0058940 A1* | 2/2015 | Robison | .......... | H04L 63/08 726/6 |
| 2015/0163121 A1* | 6/2015 | Mahaffey | .......... | G06F 11/0766 707/687 |
| 2015/0261519 A1* | 9/2015 | Hsieh | .......... | G06F 8/65 717/173 |
| 2016/0094420 A1* | 3/2016 | Clemm | .......... | H04L 43/04 709/224 |
| 2016/0179192 A1* | 6/2016 | Wu | .......... | G06F 3/013 345/156 |
| 2016/0224397 A1* | 8/2016 | Arora | .......... | G06F 9/528 |

\* cited by examiner

*Primary Examiner* — Daniel Tsui
(74) *Attorney, Agent, or Firm* — John L. Rogitz; John M. Rogitz (57) ABSTRACT

In one aspect, a device includes a processor, memory accessible to the processor, and storage accessible to the processor. The storage bears instructions executable by the processor to determine a context associated with the device and at least in part based on the determination, configure a standby portion of the memory.

21 Claims, 6 Drawing Sheets

| Operation | Application launched |
|---|---|
| Copy command | Search |
| Download photograph | Photo editor |
| Search discography | Music purchaser |

FIG. 6

| Key word(s) | Application |
|---|---|
| presenter | PowerPoint |
| listen | Internet radio |
| "your post" | Facebook |

CONFIGURATION OF STANDBY PORTION OF MEMORY BASED ON CONTEXT

FIELD

The present application relates generally to configuration of a standby portion of memory based on context.

BACKGROUND

Standby areas of computer memory can be loaded with too much data, which can lead to less than enough free memory being available in certain situations, which in turn can slow computer performance. However, as recognized herein, there are still instances where it is desirable to have data loaded into the standby area(s) so that it may accelerate access to the data at a later time. There currently are no adequate ways to balance the foregoing considerations.

SUMMARY

Accordingly, in one aspect a device includes a processor, memory accessible to the processor, and storage accessible to the processor. The storage bears instructions executable by the processor to determine a context associated with the device, where the context is determined other than based on a history of most-recently used data. The instructions are also executable to configure a standby portion of the memory at least in part based on the determination.

In another aspect, a method includes identifying one or more of a current location of a device and a current temporal parameter and, in response to the identifying, loading data into a random access memory (RAM) of the device that is predicted to be used at the device based on one or more of the current location of the device and the current temporal parameter.

In still another aspect, an apparatus includes a first processor, a network adapter, and storage bearing instructions executable by a second processor for predicting data to be used by the second processor. The data is predicted to be used based at least in part on one or more of calendar information accessible to the second processor, email information accessible to the second processor, and at least one usage pattern of the second processor that is based at least in part on at least one of a current location of the second processor and a current time of day. The instructions are also executable for loading the data into random-access memory (RAM) accessible to the second processor. The first processor transfers the instructions over a network via the network adapter.

The details of present principles, both as to their structure and operation, can best be understood in reference to the accompanying drawings, in which like reference numerals refer to like pans, and in which:

DETAILED DESCRIPTION

This disclosure relates generally to device-based information. With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
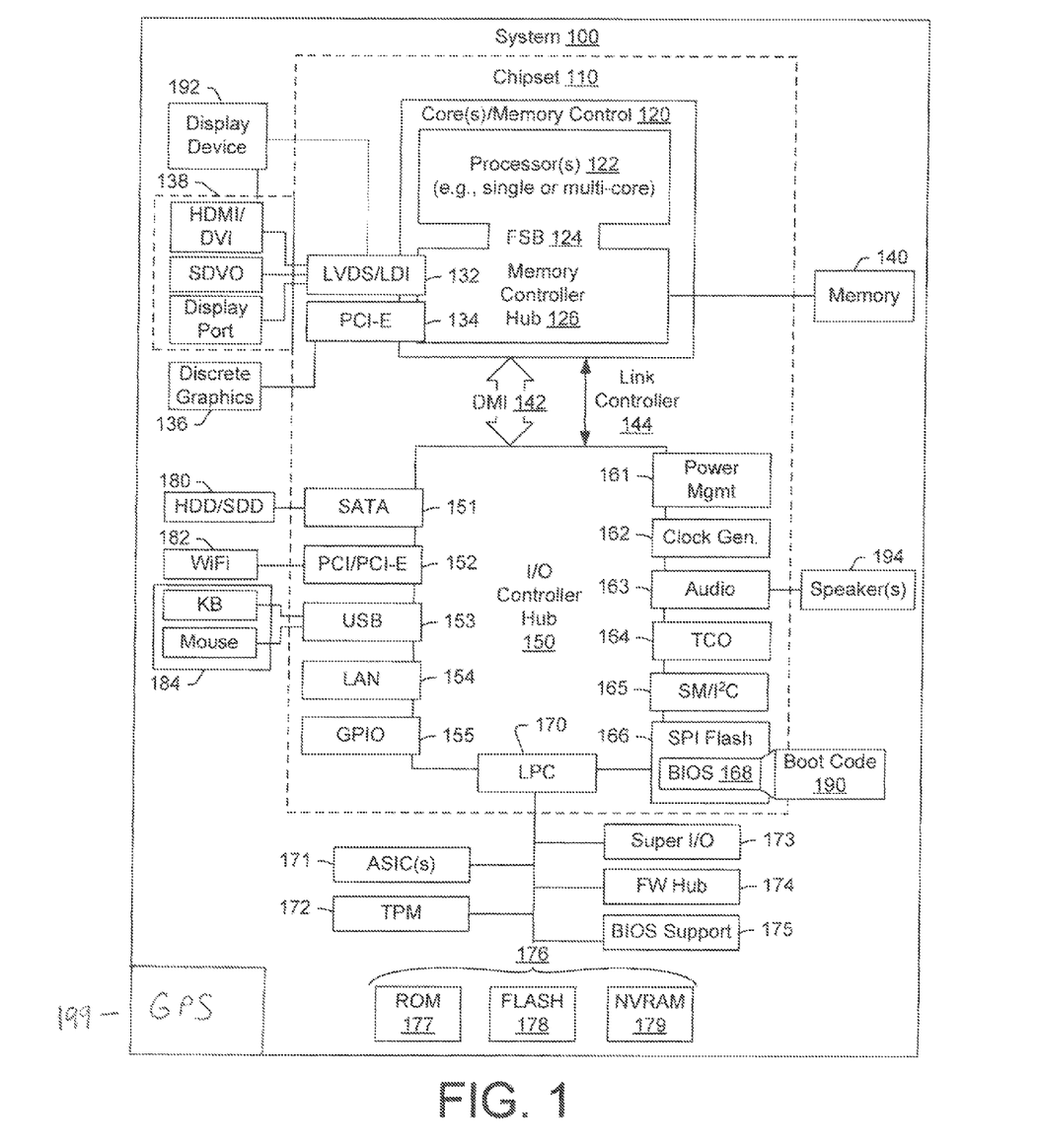
FIG. 1 is a block diagram of an example system in accordance with present principles.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be, e.g., tangible computer readable storage mediums that may not be transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include a GPS transceiver 199 that is configured to receive geographic position information from at least one satellite and provide the information to the processor 122. However, it is to be understood that another suitable position receiver other than a GPS receiver may be used in accordance with present principles to determine the location of the system 100.

Additionally, though now shown for clarity, in some embodiments the system 100 may include a gyroscope for sensing and/or measuring the orientation of the system 100 and providing input related thereto to the processor 122, an accelerometer for sensing acceleration and/or movement of the system 100 and providing input related thereto to the processor 122, an audio receiver/microphone providing input to the processor 122 based on, e.g., a user providing audible input to the microphone, and a camera or gathering one or more images and providing input related thereto to the processor 122. The camera may be a thermal imaging camera, a digital camera such as a webcam, a three-dimensional (3D) camera, and/or a camera integrated into the system 100 and controllable by the processor 122 to gather pictures/images and/or video.

Figure 2:
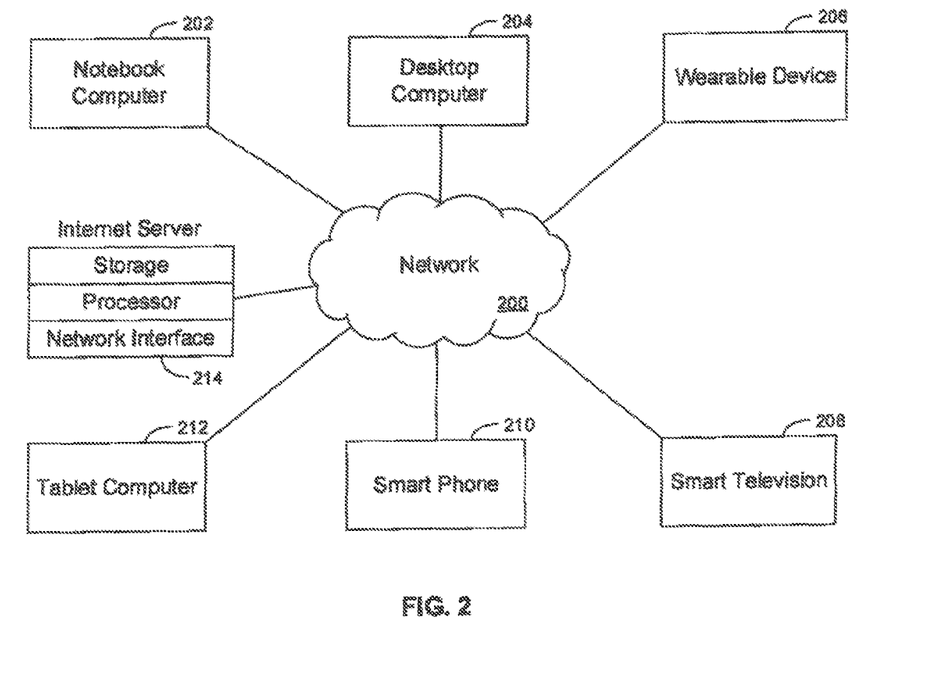
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as the Internet in accordance with present principles. It is to be understood that each of the devices described in reference to FIG. 2 may include at least some of the features, components, and/or elements of the system 100 described above. In any case, FIG. 2 shows a notebook computer 202, a desktop computer 204, a wearable device 206 such as a smart watch, a smart television (TV) 208, a smart phone 210, a tablet computer 212, and a server 214 such as an Internet, server that may provide cloud storage accessible to the devices 202-212. It is to be understood that the devices 202-214 are configured to communicate with each other over the network 200 to undertake present principles.

Figure 3:
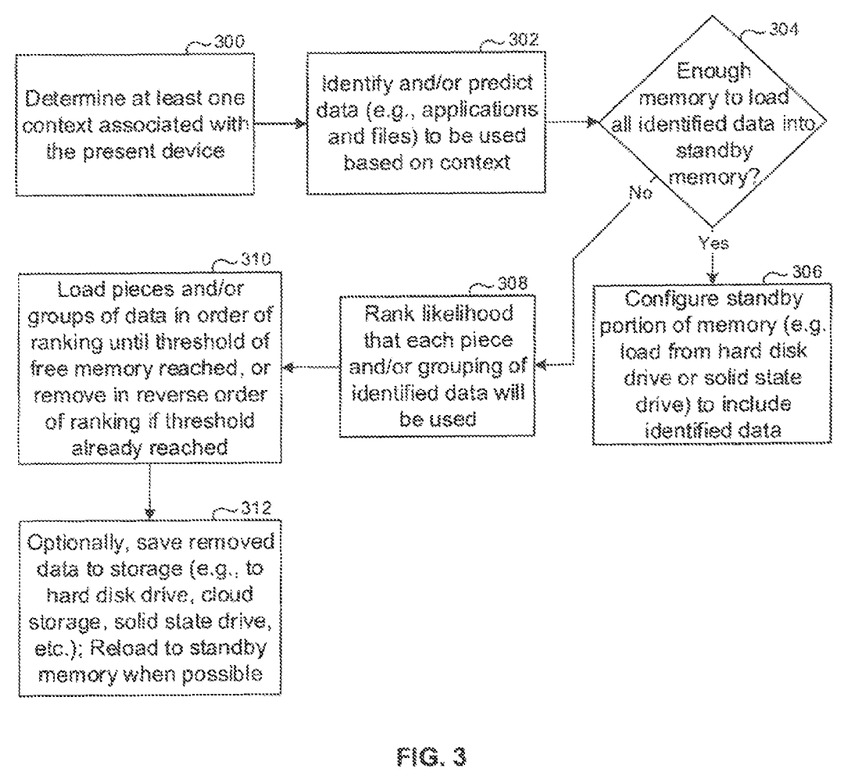
FIGS. 3 and 4 are flow charts showing example algorithms in accordance with present principles.

Referring to FIG. 3, it shows example logic that may be undertaken by a device such as the system 100 in accordance with present principles (referred to below as the "present device"). Beginning at block 300, the logic determines at least one context associated with the present device, such as the current location of the present device, the current time of day, the current day of the week, nearby devices on the same network as the present device, an operation just performed at the present device (e.g., during the same login session and/or power on session), etc.

From block 300 the logic proceeds to block 302. At block 302 the logic identifies and/or predicts data, such as applications and files, that are to be used in the future based on the identified context(s). More on determining the context(s) and data will be discussed below in reference to FIG. 4.

Regardless, from block 302 the logic proceeds to decision diamond 304. At diamond 304, the logic determines whether there is enough memory that is accessible to the present device to load all of the data identified at block 302 into a standby and/or cache portion or area of the memory. An affirmative determination at diamond 304 causes the logic to move to block 306, while a negative determination at diamond 304 causes the logic to block 308.

However, before describing those blocks, it is to be understood that the determination made at diamond 304 may be based on, e.g., whether at least or above a threshold amount of the memory is currently being used by the present device relative to a total amount of the memory so that if the threshold amount of memory is being used or above the threshold amount of memory is being used, a negative determination is made at diamond 304 based on there not being enough memory other than that which is in use (such as free memory) to load all the data identified at block 302 into the standby portion. Conversely, if below the threshold amount of memory is currently being used (or in some embodiments, the threshold and below), an affirmative determination may be made at diamond 304 based on there being enough memory other than that which is in use to load all the data identified at block 302 into the standby portion.

In addition to or in lieu of what is disclosed in the foregoing paragraph, the determination made at diamond 304 may also be based on, e.g., whether at least or above a threshold amount of the memory is free so that if the threshold amount of memory is free or above the threshold amount of memory is free, an affirmative determination is made at diamond 304 based on there being enough free memory to load all the data identified at block 302 into the standby portion. Conversely, if below the threshold amount of memory is free (or in some embodiments, the threshold and below), a negative determination may be made at diamond 304 based on there not being enough free memory to load all the data identified at block 302 into the standby portion.

Also before describing blocks 306 and 308, it is to be understood that the memory disclosed in reference to FIG. 3 may be dynamic random-access memory (DRAM) and/or static random-access memory (SRAM) such as the memory 140 described above, non-volatile RAM (NVRAM) such as the NVRAM 179 described above, still other kinds of RAM, flash-based memory such as the flash memory 178 described above, etc. It is to also be understood that the standby portion is a portion of the memory that does not comprise data currently being used by the present device. Instead, the standby portion may comprise data that is expected to be used by the present device but not currently used, and accordingly is understood to be different from other portions of the memory that are being used by a processor, reserved for hardware use, modified, and/or are free or available.

Now describing block 306, which is arrived at responsive to an affirmative determination at diamond 304, the logic may configure the standby portion of the memory to include the data identified at block 302. The data may be loaded into the standby portion from a storage area accessible to the present device, such as cloud storage, a hard disk drive (HDD), a solid state drive (SSD), etc., and furthermore the data may include items such as files (e.g., word processing documents, music files, spreadsheets), folders, and applications.

If a negative determination is made at diamond 304, note that the logic instead proceeds therefrom to block 308 where the logic ranks each piece, group, and/or portion of data (referred to below as each "piece of data" for simplicity)

identified at block 302 based on the likelihood that it will be used. The likelihood of use and hence ranking may be based on things such as frequency of use of each respective piece of data in the identified context, with the higher ranked pieces of data being used more frequently in the identified context (e.g., being used more frequently at the current location of the present device and/or the current time of day). As another example, the likelihood of use and hence ranking may be based on each respective piece of data's likelihood of use at an upcoming time indicated in calendar information (e.g., that is associated with an electronic calendar), which may be accessed by the present device to identify one or more pieces of data more likely to be accessed at the upcoming time relative to other pieces of data which would otherwise be predicted to be used at the current location and/or current time but may not necessarily be used in the context derived from the calendar information, such as if the user were to act m conformance with the calendar information rather than act in conformance with what the user would normally being using the present device for at that location and time.

As another example of ranking, if plural pieces of data are identified as being used at the current location and/or current time of day, but a first piece of data is identified as more likely to be used because, in addition to being used a threshold previous number of times at the current location and/or current time of day, the logic also determines that it will be used at the current location and/or current time of day based on the content of an email accessible to the present device (e.g., in an email account accessible to the present device) which contains a request that the first piece of data be viewed and/or used by a certain time indicated in the email. Accordingly, that first piece of data may be ranked higher than the other pieces of data prior to the time indicated in the email.

Still in reference to FIG. 3, note that the logic moves from block 308 to block 310. At block 310 the logic loads the pieces of data into the standby area of the memory in the order of the ranking (such that higher-ranked items are loaded before lower-ranked items), e.g., until a threshold of free memory is reached so that the logic stops loading the pieces of data into the memory once the threshold is reached so that the free memory continues to include at least the threshold amount for reasons such as maintaining a certain level of responsiveness to demands and/or requests to the present device not yet made.

Also at block 310, if the threshold amount of free memory is already reached and/or less than the threshold amount of memory is free, the logic may remove from the standby area some of the data therein, including data that was loaded based on context. The data may be removed based on a ranking, such as the one described above or a similar one based on data already in the standby portion, so that lower ranked items are removed before higher ranked items based on the lower ranked items being predicted to be less likely to be used based on one or more of the contexts that are identified. Furthermore, it is to be understood that data already in the standby portion that is not predicted to be used at all based on one or more contexts may be removed first, such as before removing one or more of the relatively lower-ranked pieces of data that may be used based on the particular context.

From block 310 the logic may in some embodiments move to block 312. At block 312, at least some and even all of the data that is removed from the standby portion of the memory at block 310, and/or its state information, may be serialized and/or otherwise saved to storage such as a HDD or SSD accessible to the present device so that it may be reloaded into the standby portion when possible, such as when more than a threshold amount of free memory is available again. At that point, the data and/or state information may be reloaded into the standby portion based on a ranking as described herein so that higher ranked data is reloaded first.

Continuing the detailed description in reference to FIG. 4, it shows example logic that may be undertaken by a device such as the system 100 in accordance with present principles (referred to below as the "present device") for determining and/or identifying one or more contexts as disclosed herein and identifying one or more pieces of data that are likely to be used based on the determined context(s). Thus, it is to be understood that the logic of FIG. 4 may be executed by the present device in conjunction with the logic of FIG. 3.

Beginning at block 400, the logic may identify a current location and/or current movement of the present device as a context based on input from elements such as a position receiver accessible to the present device and a motion detector (e.g., accelerometer) accessible to the present device. Thus, it is to be understood that a destination may be predicted at block 400 based on calendar information and/or email information indicating a location which is currently being moved toward by the present device. This destination may establish a context in accordance with present principles so that data predicted to be used at the destination may be loaded into the standby area of the memory prior to arrival at the destination so that it is ready to be put in use once at the destination.

In any case, the logic moves from block 400 to block 402, where the logic may identify as a context at least one temporal parameter such as a current time of day in which the present device is operating, a current day of the week in which the present device is operating, a current day of the month in which the present device is operating, and a current day of the year (e.g., a holiday, a birthday, etc.) in which the present device is operating, such as by accessing information from a clock application tracking the current time and current day at the present device. From block 402 the logic moves to block 404.

At block 404 the logic may identify one or more pieces of data such as data used, accessed, and/or (in the case of applications) initiated a threshold number of times at the current location, the current time, and/or the current day. These pieces of data may then be loaded into a standby portion of memory of the present device, such as was described above in reference to FIG. 3. However, the logic of FIG. 4 may not end there but may in some embodiments may continue to block 406.

At block 406 the logic may identify as a context an operation just performed at the present device, such as within a threshold time of the identification. Examples of such operations include executing a copy command on text based on input from the user, downloading and/or copying a photograph to storage accessible to the present device, performing a search on the present device and/or on a storage area accessible to the present device, execution of an Internet search, and/or downloading an email attachment of a particular file format, etc. These operations may be used to determine which pieces of data to load into the standby portion of the memory, such as determining to load a word processing application or Internet search application into the standby portion based on identification of the execution of the copy command, determining to load a photo editing application into the standby portion based on identification of the copying a photograph to a storage area, determining to load a particular file into the standby portion based on the context of the executed Internet search and/or keywords used for the Internet search, and/or determining to load into the standby portion an application usable to access the downloaded email attachment of the particular file format.

The logic may then move from block 406 to block 408 where the logic may also identify one or more applications previously launched within a threshold time of one or more previous instances the identified operation was performed. The applications identified at block 408 may also be loaded into the standby portion.

After block 408 the logic may then move to block 410. At block 410 the logic may identify as a context one or more of calendar information, text message information, email information and/or email attachment information, applications currently executing at the present device which may be used in conjunction with other applications not yet executing (where those other applications may be loaded into the standby portion), information in a cloud storage location, information pertaining to network information and/or nearby devices such as within a threshold distance of the present device (where applications used to communicate with the nearby device and/or otherwise undertake a function based on the nearby device may be loaded into the standby portion, such as a printer application for future printing a document if it is determined that a printer is communicatively connected to the present device), other usage patterns based on current location and current time of day other than things the things disclosed above such as launching a particular application at a particular time of day, etc. Still further, information identified at block 510 for context may also include online shopping information and/or preferences, social networking information such as data posted to the user's Facebook wall and organizations that the user has "liked" on Facebook, search history information (e.g., Internet search history information and/or storage search history information) and/or link selection information, information presented on a display of the present device and identified as being looked at by a user based on execution of eye tracking, current event information, news information, trending item information, etc.

Figure 4:
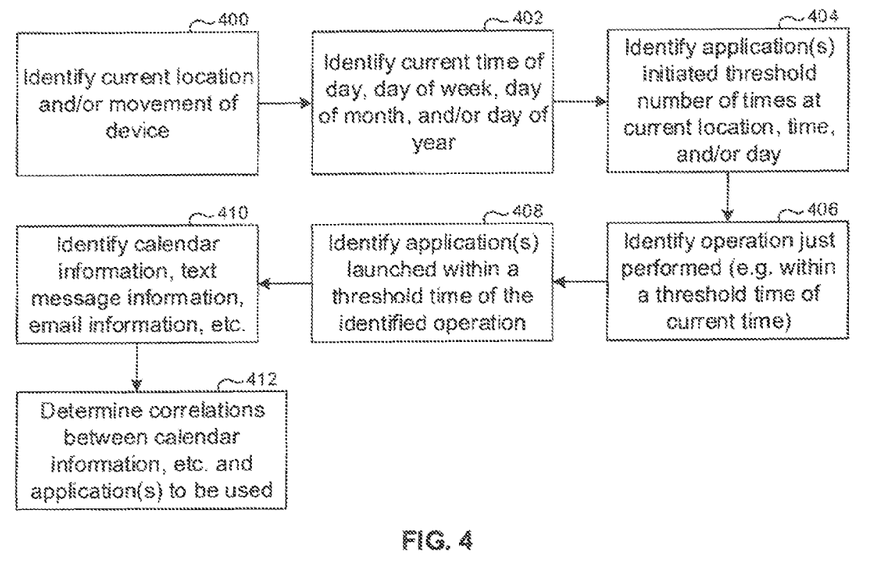

Still in reference to FIG. 4, after block 410 the logic proceeds to block 412, where based on the items identified in the logic flow (e.g., at block 410), the logic determines one or more correlations between the items and/or information used as context and one or more applications likely to be used based on the items and/or information. In some embodiments, the correlations may be made using data tables accessible to the present device (e.g., stored locally on a HDD of the present device) that correlate certain information with certain applications likely to be used, where those data tables may be created and/or modified by an administrator, by a user, and/or by the present device as information is accessed using the present device and/or as behavioral patterns emerge as the user continues to use the present device. Examples of such data tables are shown in FIGS. 5-7.

Figure 5:
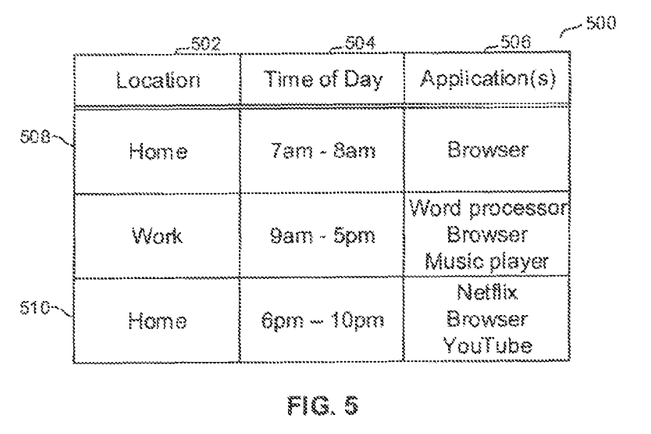
FIGS. 5-7 are example data tables that may be used in accordance with present principles.

First describing FIG. 5, it shows an example data table 500 in accordance with present principles. The data table 500 comprises a first column 502 of entries of locations at which the device has been disposed, a second column 504 of entries of times of day at which the device was disposed at the corresponding location, and a third column 506 of an application(s) likely to be used at the respective location and time of day indicated in the respective row. Accordingly, once one or both of the current location and the current time of day are determined by the device, the device may access the data table 500 (e.g., which may be stored at the device and/or at another location accessed over a network) to locate an entry in column 502 corresponding to the current location and/or an entry in column 504 for the current time of day, and then access data in column 506 at the row corresponding to the located entry or entries from columns 502 and 504 to thus determine and/or identify one or more applications to load into a standby area of memory.

Figure 6:
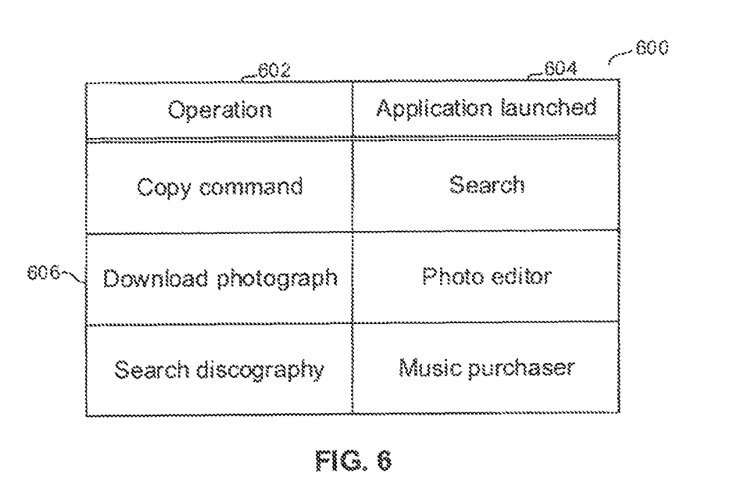
Figure 7:
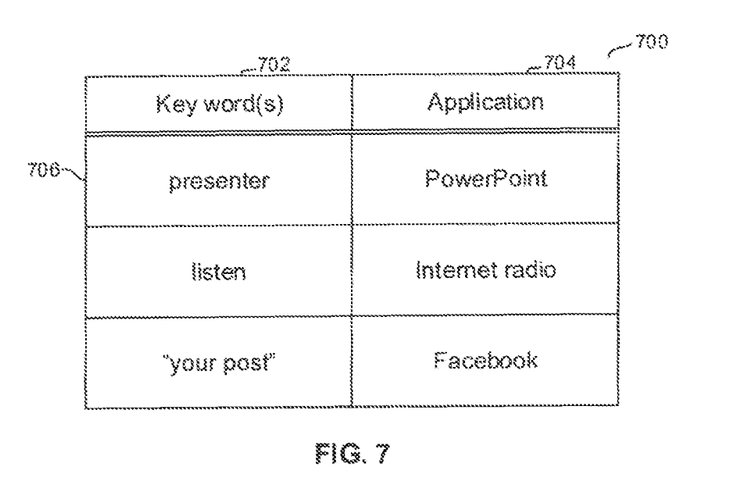

Similar methods of access and likely-to-be-used application identification may be used for the tables 600 and 700 respectively shown in FIGS. 6 and 7 as well. However, before describing those figures, an example using FIG. 5 will be provided. Suppose the device has identified the current location in which it is disposed based on GPS coordinates to be one designated as "home" by a user and indicated as such at column 502 (in the first row 508 and last row 510 in the example table 500 shown), and also suppose that the device has identified the current time of day to be eight p.m. The logic may access the table 500, identify both the first and last respective rows 508 and 510 of entries as being associated with the home location from column 502, but then identify only the last row 510 as being associated with the current time of day since column 504 at the last row 510 indicates a time range of six to ten p.m. The device may thus go to the entry in column 506 for the last row 510 and access the information contained therein to identify the application(s) likely to be used at that location and time. In this example, the applications include a Netflix application, a browser application, and a Youtube application.

Now describing FIG. 6, it shows an example data table 600 in accordance with present principles, where the data table 600 pertains to applications likely to be launched based on a context of an operation just performed as described herein. The data table 600 comprises a first column 602 of operations that may be identified as being performed at the present device. As may be appreciated from column 602, examples of such operations include executing a copy command, downloading a photograph, and performing a discography search for a particular musical artist. In one embodiment, the device may undertake the logic of FIGS. 3 and/or 4, and/or access the table 600, in response to such an operation and at least attempt to locate an entry at column 602 corresponding to the operation. Then, responsive to locating such an entry at column 602, the device may access the data at column 604 in the row for the corresponding entry, which includes indications of an application(s) likely to be used and/or initiated after performance of the corresponding application (e.g., as determined based on past use and entered to the data table 600 previously), to thus determine and/or identify one or more applications to load into a standby area of memory based on an operation that has been performed.

Providing an example using FIG. 6, suppose that a device performs an operation to download a photograph from an email to a storage area of the device. The device may access the data table 600 and parse the entries in column 602 until a match is identified of one of the entries in column 602 to the operation that was performed, which in this case would be at row 606. The logic may then access the indication of an application likely to be used at column 604 for row 606 to thus identify a photo editor application as an application likely to be initiated after execution of a photograph download operation, and hence determine that a photo editor application should be loaded into a standby area of the device's memory for relatively fast access should a user initiate the photo editor application after the operation is performed.

Continuing the detailed description in reference to FIG. 7, it shows yet another example data table 700 to be used in accordance with present principles, where the data table 700 provides correlations between key words that may be identified from information accessed by a device (e.g., from calendar information, email information, other information described above in reference to block 410 of FIG. 4, etc.) and a respective application(s) likely to be used based on the key word(s).

The data table 700 comprises a first column 702 containing respective entries of at least one key word or key phrase that may be identified from information accessed by the device. As may be appreciated from column 702, examples of such key words and phrases include "presenter", "listen", and "your post". Then, responsive to matching a word or phrase from information that was accessed to one of the entries in column 702, the device may access the data at column 704 in the row for the corresponding entry, which includes indications of an application(s) likely to be used and/or initiated based on the key word or phrase (e.g., as determined based on past contexts and instances identified by the device and entered to the data table 700 previously), to thus determine and/or identify one or more applications to load into a standby area of memory.

Providing an example using FIG. 7, suppose that a word "presenter" is identified from an email that also indicates information about an upcoming meeting at a particular date, time, and location. A device in accordance with present principles may determine that it is moving toward the location at the particular date and before the particular time after previously identifying that information from the email. In order to determine which applications to place in a standby portion of the device's memory for relatively fast access thereto when at the destination, the logic may access the data table 700 and parse the column 702 until a match is made between one of the words in the email with one of the entries in column 702. Once a match is made at row 706 for the word "presenter", the logic may go to the entry at column 704, row 706 to identify a PowerPoint application as an application likely to be used. E.g., the data table may have been configured by the user to correlate the PowerPoint application to the key word "presenter" since meetings in which the user is designated as a presenter are meetings in which the user uses the PowerPoint application to present a topic.

Figure 8:
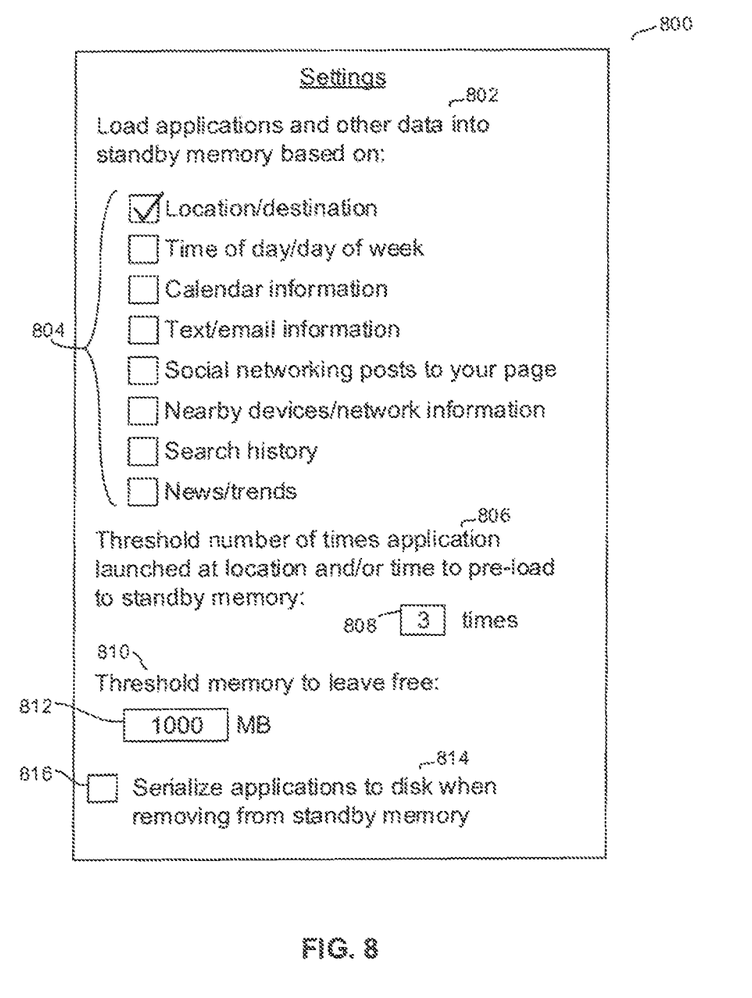
FIG. 8 is an example user interface (UI) in accordance with present principles.

Now in reference to FIG. 8, it shows an example user interface (UI) 800 presentable on a display accessible to a device. The UI 800 may be presented responsive to a user command to configure settings for the device for undertaking present principles. A first setting 802 is shown that provides one or more options for determining contexts in which applications and/or other data should be loaded into a standby area of the device's memory so that it may be more quickly placed into use when requested by the user and/or when the application is actually initiated or launched. Each of the options shown for the setting 802 is associated with a respective check box 804 that is selectable to automatically without further user input configure the device to use the respective context indicated at each respective option as a way of determining which application(s) or other data to place in the standby portion. Accordingly, the options in this example include location/destination, time of day/day of the week, calendar information, text/email information, social networking posts to the user's social networking page, nearby devices/network information, search history, and news/trends. In the present example, only the option for location/destination has been selected by the user.

The UI 800 may also include other settings, such as a setting 806 for configuring and/or establishing a threshold number of times that an application is to be launched at a particular location and/or at a particular time for it to then be preloaded into standby memory the next time the device determines it is again at the particular location and/or operating at the particular time. A number entry box 808 is thus provided at which a user may select and/or enter a number to establish as the threshold number of times. In the present example, the threshold has been set at three.

Still in reference to FIG. 8, in some embodiments the UI 800 may also include a setting 810 for configuring and/or establishing a threshold amount of memory to maintain as free memory, such as the threshold amount of memory that is free as described above in reference to diamond 304 of FIG. 3. Thus, it is to be understood that even when the device determines applications to place into the standby portion of its memory based on context, it may do so only until the threshold minimum amount of free memory is reached, and at that point would not place any more data and/or applications in the standby portion so as to maintain at least the threshold amount of free memory. Regardless, it may be appreciated from FIG. 8 that the setting 810 includes a number entry box 812 at which a user may select and/or enter a number to establish the threshold amount of free memory. In the present example, this threshold has been set to one thousand megabytes.

As may also be appreciated from FIG. 8, the UI 800 may also include a setting 814 to enable serialization of and/or storage of applications to disk when removed from a standby portion of the device's memory as described herein. Accordingly, a check box 816 is included which is selectable to automatically without further user input enable such serialization.

It may now be appreciated that present principles provide for detecting one or more contexts and to pre-cache applications a user is likely to run in that context(s), while in some embodiments also freeing up memory from applications that the user is not likely to use. Present principles are understood to apply to standby memory rather than memory currently in use so that, e.g., uninitiated, closed, and/or suspended apps may be loaded into standby memory based on context.

In some embodiments, a software agent may be used and/or executed to track user habits and thus establish or identify, context(s) as described herein. In some embodiments, if a device enters or identifies a context (e.g., location) and also has a level of free memory below a threshold, the agent may remove applications occupying standby memory that are determined to typically are not used in that context (e.g., Outlook at home or Photoshop at work) to thus increase the current amount of free memory and improve system responsiveness to new demands. Furthermore, the data that is freed from the standby memory may in some embodiments be serialized to a buffer to be potentially re-cached in the future. Thus, if the device enters or identifies a certain context and also has a level of free memory above the threshold, the agent may load serialized cached application memory appropriate for that context into the standby memory area that includes a pool of applications the user frequently uses in that context. Furthermore, when the device loads the serialized data back into the memory, and even at other times such as periodically while such data is in the standby portion of the memory, the device may perform a standby memory check and/or verification to determine if data in storage which was loaded into the standby portion of the memory has changed in the storage since it was loaded into the memory to ensure. e.g., that a newer version of the data than was is in the standby memory does not exist in storage and/or that the data has not been deleted (e.g., an application has been uninstalled) from storage after being loaded into the standby portion.

Context may be determined based on things such as a thematic analysis of email accounts and electronic calendars, pattern matching of device activities (such as that every time new photos are copied to the device, the user subsequently launches photo editing software), and/or a combination of any of the things described herein. Providing a brief example, suppose a user is emailing drafts of a research paper to be published between people, and a thematic analysis of the emails reveals that the submission deadline for the research paper is two weeks away. Pattern matching may be used to determine how often and when the user is working on the paper. Based on the thematic analysis and pattern matching, the standby memory may cache the research paper during the typical times the user works on the research paper until after the submission deadline, and then the importance of that activity is less owing to the submission deadline passing and accordingly another task may be ranked as more important and hence data for that other task may subsequently be cached above or before the research paper.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

While the particular CONFIGURATION OF STANDBY PORTION OF MEMORY BASED ON CONTEXT is herein shown and described in detail, it is to be understood that the subject matter which is encompassed by the present application is limited only by the claims.

What is claimed is:

1. A device, comprising:
a processor;
memory accessible to the processor; and
storage accessible to the processor and bearing instructions executable by the processor to:
determine at least one context associated with the device; and
at least in part based on the determination, configure a standby portion of the memory;
wherein the processor configures the standby portion of the memory by removing from the standby portion at least some data at least in part based on the determination of the at least one context associated with the device and at least in part based on a determination that at least a first threshold amount of the memory is currently being used by the device, and wherein the processor reloads the removed data based on a second threshold amount of the memory becoming available.

2. The device of claim 1, wherein the processor configures the standby portion of the memory to comprise data expected to be used based on the at least one context.

3. The device of claim 1, wherein the standby portion is a portion of the memory that does not comprise data currently being used by the processor.

4. The device of claim 1, wherein the memory comprises random-access memory (RAM).

5. The device of claim 1, wherein the at least one context associated with the device comprises at least one application initiated at least a threshold number of times at a current location of the device, the threshold number of times being greater than one.

6. The device of claim 1, wherein the processor configures the standby portion of the memory at least in part based on the determination of the at least one context associated with the device and at least in part based on a determination of an amount of the memory that is free.

7. The device of claim 1, wherein the at least one context associated with the device comprises information being looked at by a user.

8. The device of claim 7, wherein the information being looked at by the user is identified based on execution of eye tracking.

9. The device of claim 1, wherein the processor configures the standby portion of the memory by adding to the standby portion at least some data based on the at least one context at least in part based on a determination that at least a third threshold amount of the memory is free.

10. The device of claim 1, wherein the at least one context associated with the device comprises an operation just performed at the device and an application launched within a threshold time of at least a most-recent time the operation was previously performed; and
wherein the processor configures the standby portion of the memory at least in part by loading the application into the standby portion.

11. The device of claim 1, wherein the instructions are executable by the processor to:
present, on a display, a user interface (UI) comprising one or more options that are each selectable to select respective contexts to use for configuration of the standby portion of the memory.

12. A method, comprising:
identifying at least one context associated with a device;
in response to the identifying, loading first data into a random access memory (RAM) of the device that is predicted to be used at the device based on the at least one context and removing from the RAM second data at least in part based on the identifying of the at least one context associated with the device and at least in part based on identifying that at least a first threshold amount of the RAM is currently being used by the device; and
reloading the second data into the RAM based on a second threshold amount of the RAM becoming available.

13. The method of claim 12, wherein the method comprises:
identifying network information; and
loading data into the RAM that is predicted to be used at the device based on the network information.

14. The method of claim 12, wherein the method comprises:
presenting, on a display, a user interface (UI) comprising one or more options that are each selectable to select respective contexts to use for loading data into the RAM.

15. The method of claim 12, wherein the device is a first device, and wherein the at least one context associated with the device comprises a second device being within a threshold distance to the first device.

16. The method of claim 15, wherein the method comprises:
identifying the first device as being on a same network as the second device; and loading data into the RAM that is predicted to be used at the first device based on the second device being on the same network as the first device.

17. An apparatus, comprising:
a first processor;
a network adapter; and
storage bearing instructions executable by a second processor for:
predicting first data to be used by the second processor, wherein the first data is predicted to be used based at least in part on identifying at least one context;
based on the predicting, loading the first data into random-access memory (RAM) accessible to the second processor and removing from the RAM second data, wherein the second data is removed from the RAM at least in part based on the identifying of the at least one context and at least in part based on identifying that at least a first threshold amount of the RAM is currently being used; and reloading the second data into the RAM based on a second threshold amount of the RAM becoming available;
wherein the first processor transfers the instructions over a network via the network adapter.

18. The apparatus of claim 17, wherein the first data is predicted to be used based at least in part on Internet search history information.

19. The apparatus of claim 17, wherein the first data is predicted to be used based at least in part on link selection information.

20. The apparatus of claim 17, wherein the first data is predicted to be used based at least in part on one or more of: current event information, news information.

21. The apparatus of claim 17, wherein the at least one context comprises a context identified based on input from an accelerometer.

* * * * *